Feb. 13, 1945.   J. P. VOLLRATH   2,369,624
PYROMETRY
Filed Feb. 13, 1942   3 Sheets-Sheet 1
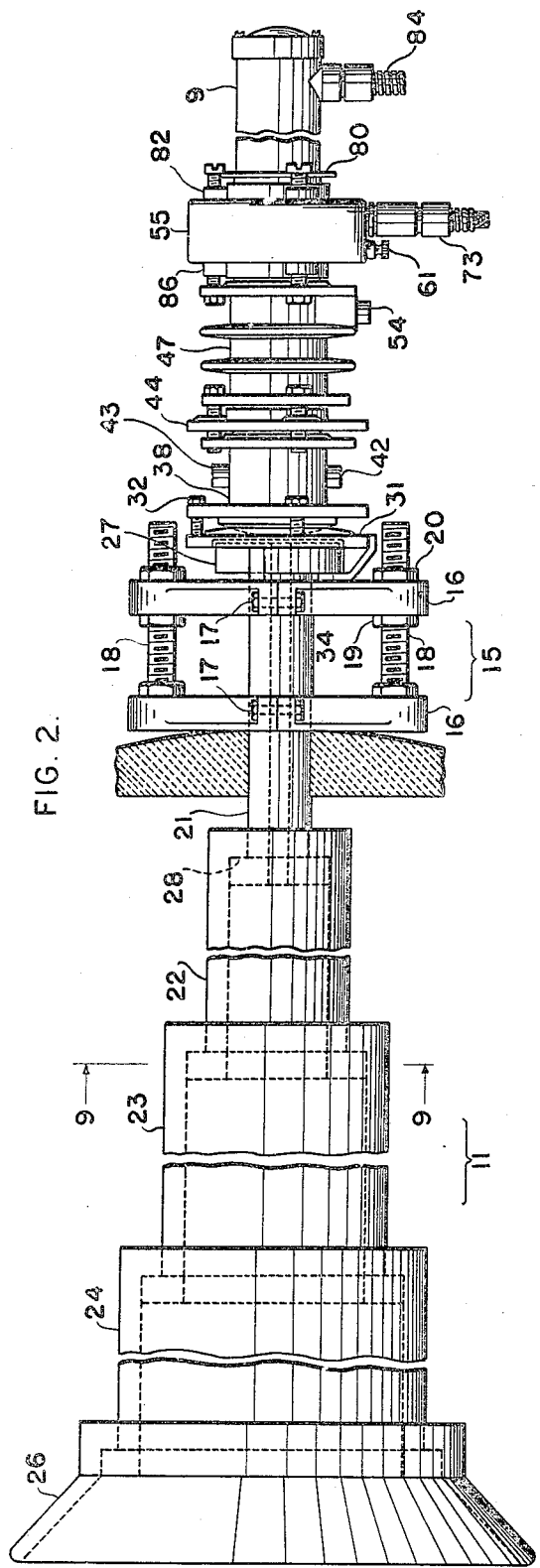
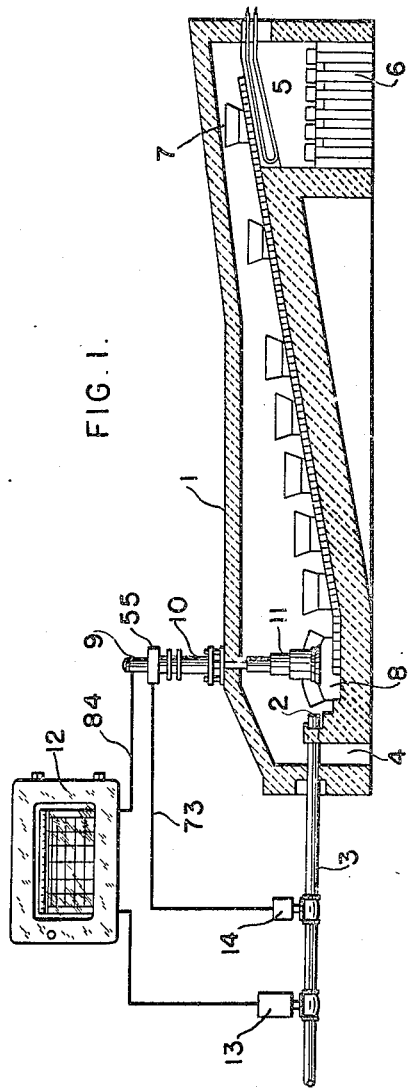
INVENTOR.
JOSEPH P. VOLLRATH
BY C. B. Spangenberg Feb. 13, 1945.   J. P. VOLLRATH   2,369,624
PYROMETRY
Filed Feb. 13, 1942   3 Sheets-Sheet 3
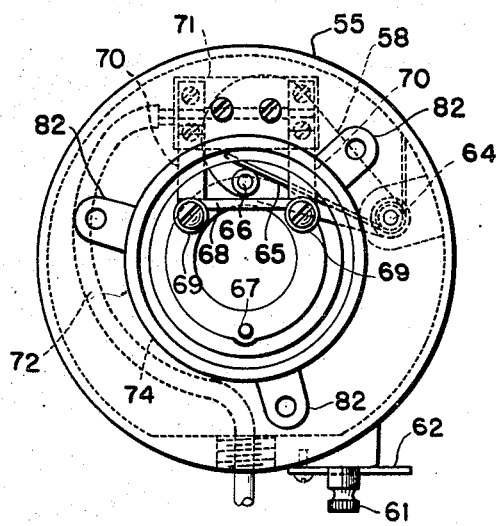
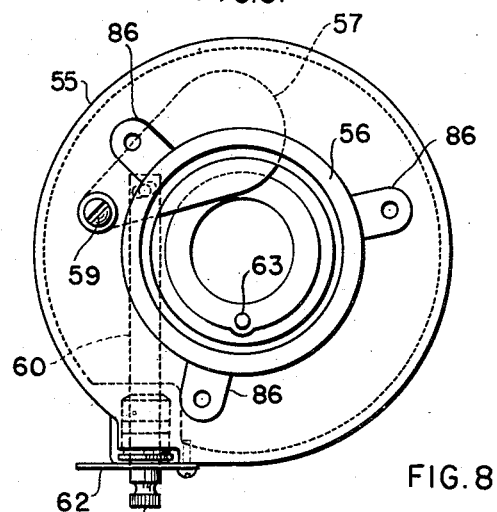
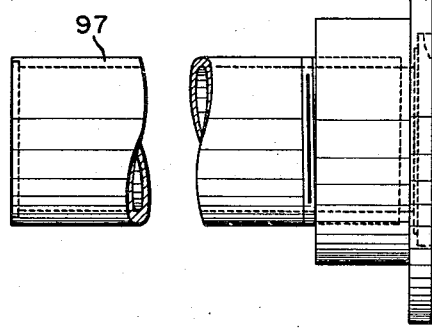
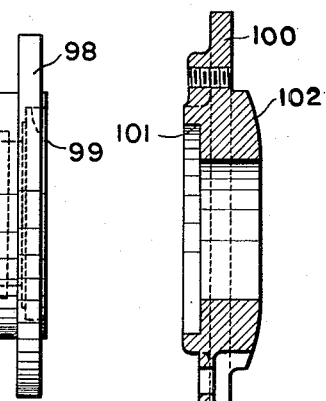
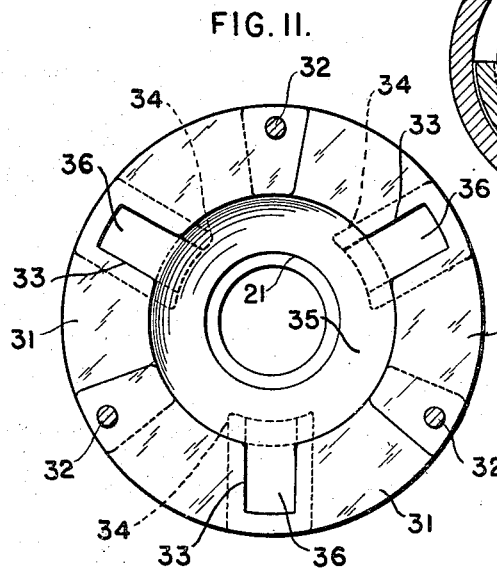
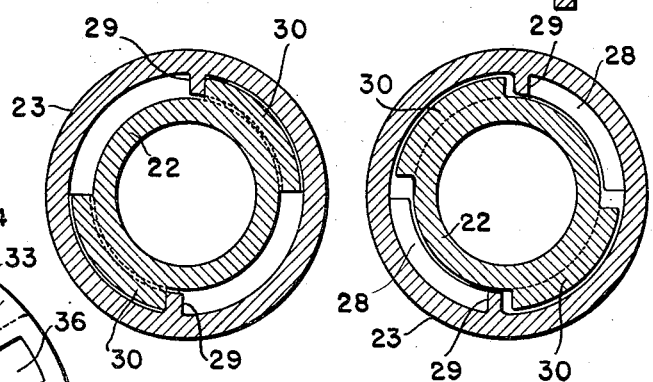
INVENTOR.
JOSEPH P. VOLLRATH Patented Feb. 13, 1945

2,369,624

UNITED STATES PATENT OFFICE 2,369,624

PYROMETRY

Joseph P. Vollrath, Glenside, Pa., assignor to The Brown Instrument Company, Philadelphia, Pa., a corporation of Pennsylvania Application February 13, 1942, Serial No. 430,715

14 Claims. (Cl. 236—15)

The present invention relates to radiation pyrometers and more particularly to the accessories which are used with those pyrometers in the measurement of high temperatures.

As is well known, a radiation pyrometer is directed toward a hot body whose temperature is to be measured, and measures the radiation from this body. In view of the fact that the temperatures measured are extremely high, various means are necessary to protect the instrument itself from any excessive heat. For this reason various accessories are used with such an instrument, which accessories may be varied depending upon the type of use to which the instrument is put. When, for example, the instrument is used to measure the temperature of work in a furnace that has a long flame playing over the work, some means must be provided to prevent the flame from having any effect on the pyrometer or an erroneous reading will be obtained. To this end various types of shields have been provided which will permit the pyrometer to be sighted directly on the work without being affected by flames or by smoke that may be in the furnace.

The applicant has invented a new type of shield to be used with a radiation pyrometer, which shield is to be used in connection with other accessories to protect the pyrometer itself from excessive heat that may be radiated to the instrument from the work.

While the accessories described herein are adapted to be used with any type of furnace or other apparatus which is to have its temperature measured by a radiation pyrometer, they will be described as being used with a billet reheating furnace of the type in which a flame is used to reheat the work. In such an application a shield which extends into proximity with the work is necessary in order to prevent the flame or the smoke in the furnace from obscuring the pyrometer and thereby producing inaccurate records. Furthermore some means is necessary to protect the instrument itself from heat which may be conducted or radiated to the body of the instrument as well as some means which will close off the pyrometer from the work if the heat directed upon the instrument increases beyond some particularly dangerous point.

The shield which forms part of this invention consists of ceramic sighting tube made of sections which are adapted to be fastened together in order to procure a tube of any desired or necessary length. Previous to this invention it has often been necessary to unduly limit the field of the pyrometer or to have the tubes too short, because of manufacturing difficulties which are encountered in making longer and larger ceramic tubes. In addition there is disclosed a water cooled unit and an air cooled unit which serve to prevent radiation of heat to the body of the pyrometer. In certain cases, furnaces are operated under positive pressure to prevent infiltration of air and gases which would tend to harm the work. In furnaces of this type smoke and particles of soot have a tendency to enter the sighting tube and lodge on the lens of the pyrometer thereby causing inaccurate readings. The air cooled fitting of this case is provided with means whereby air can be forced into the same and down through the sighting tube so that the tube can be kept under a pressure higher than that in the furnace at all times and can be kept clean to prevent particles of soot and other suspended matter from depositing on the lens of the pyrometer.

In some cases when because of excessive temperature or other reason the ceramic sighting tube breaks, or if purging air should fail flame may be directed through the remainder of the tube toward the pyrometer to endanger the same. In such cases some automatically operating means is necessary to protect the instrument. To this end there is provided a safety shutter unit having manually and automatically operated shutters which may be closed to protect the instrument. The manual shutter is adapted to be closed at any time when the instrument is to be removed for cleaning or repair or other reason. The automatic shutter will be closed upon the advent of any sudden dangerous increase in temperature or flame conditions, to protect the pyrometer at such times. The accessories described herein when used together or in various combinations serve to protect the radiation pyrometer instrument and at the same time serve to insure dependable and accurate operation of the same.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings—

Fig. 1 is a sectional view of the furnace showing a use of my pyrometer assembly, Fig. 2 is an enlarged view showing the entire group of accessories which may be used with the pyrometer.

Fig. 4 is a view of the shutter unit from the right in Fig. 3,

Fig. 5 is a view of the shutter unit from the left of Fig. 3,

Fig. 6 is a view taken from the right end of Fig. 2,

Fig. 7 is a view of an attachment to be used with a metal tube,

Fig. 8 is a view of one portion of a ball and socket joint,

Fig. 9 is a view taken on lines 9—9 of Fig. 2 showing portions of the sighting tube assembled.

Fig. 10 is a view similar to Fig. 9 showing the parts disassembled,

Fig. 11 is a view taken on lines 11—11 of Fig. 3, and

Figure 3:
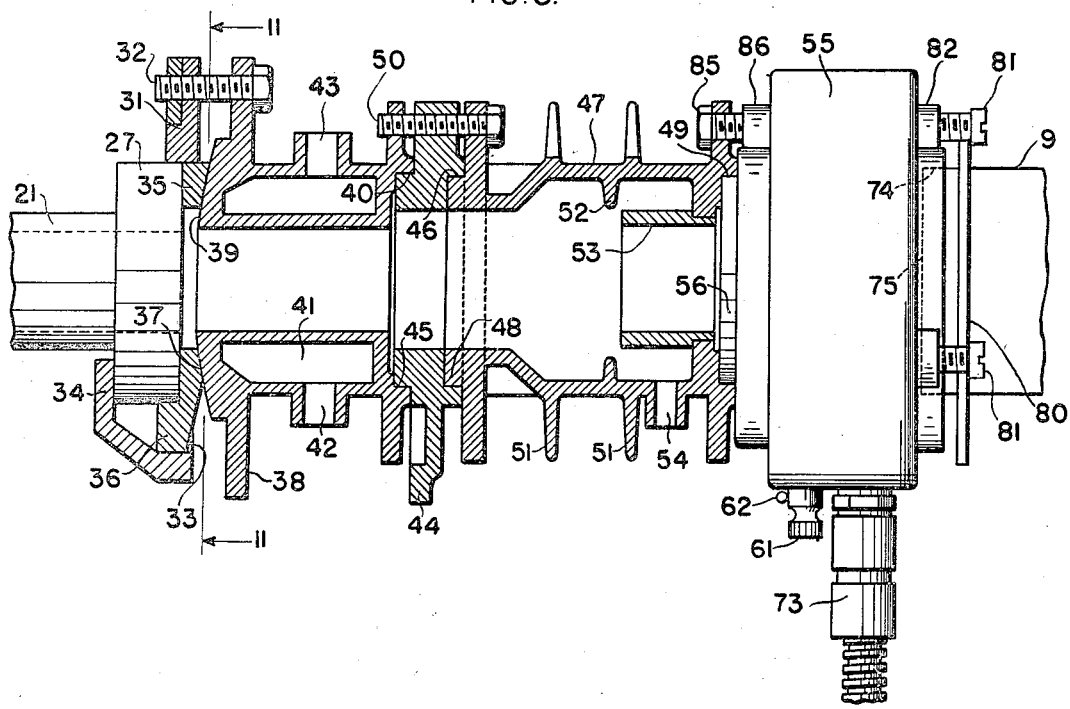
Fig. 3 is an enlarged sectional view showing the air cooled and water cooled units.

Referring to Fig. 1 there is shown a billet reheating furnace 1 of the recuperating type in which the billets are heated by a flame which is supplied from a burner 2 that is in turn supplied with fuel through a pipe 3. The air for combustion passes through an inlet passage 4 and the products of combustion pass down through a passageway 5 which contains a recuperative checker unit 6. In a furnace of this type billets 7, to be heated, are placed in the furnace endwise from a direction perpendicular to the paper and move to the left to be removed lengthwise from the furnace through a door or opening 8. The temperature of the billets nearest the exit is to be controlled so that they are brought to the proper temperature for rolling or other working. To this end a radiation pyrometer 9 is mounted and connected to suitable accessories, shown diagrammatically in this figure and more in detail in the other figures of the application, on the furnace roof with a sighting tube 11 directed toward those billets which are nearest the exit of the furnace. In the operation of the device the temperature of the billets is measured by the pyrometer and such measurement is recorded by any suitable measuring and recording device 12. This latter instrument has control mechanism and is used to automatically control a fuel valve 13 in the fuel supply line 3 to adjust this fuel in such a manner that the billets will be brought up to the proper temperature. In addition to this there is provided a shutter means 55 which operates to protect the pyrometer against unusual flame conditions and to protect the furnace contents against possible removal of the pyrometer. This shutter unit is also provided with means to turn off the fuel to the furnace and sound an alarm when the shutter closes.

In the roof of the furnace just above the hottest billets or those which are nearest to the exit opening 8 there is provided an opening through which the ceramic sighting tubes 11 extend. Located on the top of the furnace roof and surrounding this opening is a support 15. This support consists of a pair of rectangular plates 16 each of which is made in two sections that are held together by bolts 17. Along the dividing line between the two sections of each plate is an opening corresponding to the diameter of the upper one of the sighting tubes. Bolts 18 extend upwardly or to the right from the left plate 16 in Figure 2 to support the other plate 16. Each of these bolts is provided with a nut 19 that is positioned along the bolt and against which the other plate 16 is forced. There is provided another set of nuts 20 over the ends of the bolts 18 to hold the second plate 16 in place. Extending through the wall of the furnace and through the openings in the plates 16 is the upper ceramic tube 21 which is the smallest of a series of sighting tubes the others of which are numbered 22, 23 and 24. On the left end of the tube 24, as shown in Fig. 2, is an umbrella shaped radiation shield 26.

The tube 21 has an enlarged collar 27 which rests against the upper surface of the upper plate 16 or against a hooked part of a tube clamp which will be described later. Each of the tube sections 22, 23 and 24 is provided at its upper end or right end in Fig. 2 with a pair of inturned flanges 28 (see Fig. 9) which terminate at one end in stops 29. Each of the tubes and tube 21 is provided on its lower end with a pair of diametrically opposed outwardly extending flanges 30. Each of these flanges extend for approximately 90 degrees. In placing the various tubes together the tubes held relative to each other with the flanges in the positions in Fig. 10 and the lower tube is moved up until its flanges 28 are above the flanges 30 of the adjacent tube. After this the lower tube, or the larger one as shown in Fig. 10 is rotated clockwise until the stops 29 bear against the ends of the flanges 30 as shown in Fig. 9. In this fashion each tube is supported by its flanges 30 resting against the flanges 28 on the adjacent tube. The radiation shield 26 is supported in a similar manner by the lower end of the tube 24.

Because of the manner in which these sighting tubes are made any desired number of sections can be put together to form a tube of the proper length for the individual furnace with which it is used. If for some reason the interior of the furnace is of such a height that any number of tube sections would be too long or too short the plates 16 can be moved closer together or further apart as the case may be to take up an amount sufficient to compensate for the fractional length of a tube which is needed. It should also be noted that in view of the fact that each successive tube is larger in diameter than the tube above it that a cone of radiation will be directed toward the pyrometer. This is desirable since in most pyrometers the lens is adapted to increase the field of view with an increase in the distance of the object from the instrument. The shield 26 can be made in sizes to be attached to any of the tubes so that it can be used, if necessary, no matter how many sections of the sighting tubes are put together for any particular application.

The pyrometer 9 is attached by suitable accessories and fixtures to the upper end of the tube 21 by means of clamps which engage with the flange 27 on this tube. As is shown in Figures 3 and 11 a tube clamp is formed of three sections 31 which when bolted together form a circle of a circumference sufficient to encircle the flange 27. Each of these sections 31 is provided with a recess 33 as shown in Fig. 11 and a hook portion 34 which is adapted to extend around the flange 27. Cooperating with the tube clamp is a socket member 35 that has extending from it three lugs or wings 36 which are received in recesses 33. In this fashion the tube clamp is held in place on flange 27. Referring to Fig. 3 it will be seen that the right face of the socket member 35 is concave as shown at 37 so that it will form a spherical seat.

Cooperating with the sections 31 and the socket 35 is a water cooled unit 38 which is held in position against the socket and is drawn toward the clamp by means of three bolts 32. These bolts also serve to hold the three sections 31 together to form the tube clamp. The left end of the water cooled unit is formed with a convex surface 39 which forms a spherical ball joint to cooperate with the surface 37. Because of the shapes of these surfaces 37 and 39 the unit 38 can be adjusted by manipulation of three bolts 32, in a manner to properly line up its opening with the tube opening 21. The right end of the unit 38 is provided with a countersunk bore 40 to receive other accessories. Since this unit is water cooled it is provided with an annular passage 41 through which water may be forced from an inlet 42 to an outlet 43. The unit is intended to prevent the passage of heat by radiation or conduction through it to the pyrometer. The water cooling of this unit will protect the pyrometer without in any way affecting the radiation that goes through its center opening to the lens of the pyrometer.

In between the water cooled unit 38 and an air cooled unit to be described, there is placed a spacer 44 that is provided on its left face with a projection 45 which is received snugly by the counterbore 40 on the water cooled unit. This spacer is provided on its right surface with a counterbore 46.

An air cooled unit 47 is attached to the spacer 44. This unit has on its left edge a projection 48 that is received in the counterbore 46 of the spacer. The units 38 and 47 and the spacer 44 are provided with openings through which bolts 50 extend to hold these parts in a fixed relation with one another. The unit 47 is provided on its right end with a countersunk portion 49 in a manner similar to those previously described. Extending around the outside of the air cooled unit are radiation fins 51 which are cut out at their upper portion so that the bolts 50 can be readily threaded into place. A flange 52 is formed on the interior of the unit and cooperates with a cylindrical sleeve 53 to form a small annular passage between the two. Air is blown in through an opening 54 through the passage between the flange and the sleeve and out through the units 38 and 47 and the sighting tubes. In some cases smoke, ash, etc., will have a tendency to come up through the sighting tube 11 and the units 38 and 47 and be deposited on the lens of the pyrometer thus producing incorrect readings. The purpose of the air blast forced in through inlet 54 is to produce a positive pressure in the upper end of the pyrometer assembly so that foreign matter cannot come into the assembly.

It is noted that the water cooled unit 38 as shown herein as having a ball joint 39 formed on its left end whereas the air cooled unit is shown as having a projection 48 on its left end. It should be understood that either of these units can be formed in either way. It is generally found to be best to form the fitting which is placed nearest the sighting tubes with the ball joint so that the remainder of the assembly can be adjusted with respect to those tubes to line up the openings of the various elements of the assembly. If the water cooled fitting is not deemed to be necessary a surface similar to surface 39 would normally be formed on the left end of the air cooled fitting 47 so that it could be properly lined up. The various parts may be so made that they can be placed together in any desired combination and it is merely a matter of changing the shape of the left ends of these two fittings so that this may be accomplished.

Fastened to the right side of the air cooled fitting is a shutter unit 55. This shutter unit is provided on its left side with a projection 56 that fits into the counterbore 49 of the air cooled fitting. The shutter unit is held in place by means of screws 85 extending through a flange on the right end of the air cooled fitting and into lugs 86 formed on the shutter unit. The shutter unit itself consists of a manually operated shutter 57 and an automatically operated shutter 58 which are shown in detail in Figures 5 and 4 respectively.

The manually operated shutter 57 is pivoted at 59 in the shutter unit 55 and may be moved by a rod 60 pivoted thereto into a position in which it obstructs the central opening of the shutter unit. The rod extends through an opening in the casing and is provided on its lower end with a knob 61 so that the shutter can be raised and lowered in Fig. 5 to move it into and out of its position over the axial opening in the unit. A spring 62 is attached to the exterior of the shutter unit and engages a groove formed in the knob 61 or the side thereof when the shutter is in its open position in order to prevent accidental displacements of the same. When the shutter is moved into its closed position the spring 62 is first moved away from the side of the knob and the knob 61 is then moved downwardly. A stop 63 is provided in the shutter casing to limit the movement of the shutter 57 when the opening is closed.

The automatic shutter 58, shown in Fig. 4, is pivoted in the casing at 64 and is normally biased in a closed direction by means of a spring 65. The shutter is provided with a knob 66 formed of some insulating material against which one arm of the spring bears so that the shutter is at all times biased towards its closed position which is limited by means of engagement between the shutter and a stop 67 that is formed in the casing. The shutter is maintained in its open position during normal operation of the pyrometer by means of engagement of the projection 66 with a fuse link 68. This link is held in position by means of screws 69 that are directed into supports 70 which supports in turn are mounted on an insulating block 71 that is rigidly attached to the wall of the shutter unit. Each of the supports 70 is connected to a wire 72 that extends out of the unit through a conduit 73 to a control system which will be described below. By means of the use of insulating members 66 and 71 the fuse link 68 and the supports 70 can form part of an electric circuit which is completely insulated from the rest of the unit.

The normal use of these shutters is such that if the pyrometer 9 is to be disconnected for any reason the manual shutter 57 may be moved to its closed position to prevent an attendant from being burned by the heat radiated through the assembly and can also be moved to its closed position to prevent the infiltration of air into the furnace if the latter has a controlled atmosphere or if it is operated under pressure or when the fuse link 68 is to be replaced. The automatic shutter operates to cut off radiation through the sighting tube from the furnace to the pyrometer if for some reason flames should come through the sighting tube. The flame would have sufficient heat to melt the fuse link 68 and thereby permit the automatic shuter 58 to close and shut off radiation to the pyrometer before any damage could be done to the same. The shutter unit is provided with a counterbore 74 that is adapted to receive a projection 75 on the end of the pyrometer 9. The pyrometer is held in position against the shutter unit by means of a flange 80 formed on the pyrometer and the heads of screws 81 which are threaded into lugs 82 formed on the shutter unit. As is best shown in Fig. 6, the arrangement is such that when the screws are loosened the pyrometer itself may be rotated to bring cut out portions 83 formed in the flange 80 under the heads of the screws so that the pyrometer can be lifted out of position. This in effect forms a type of bayonet joint. A conduit 84 extends from the pyrometer and carries the lead wires between this instrument and the recording instrument 12.

Figure 12:
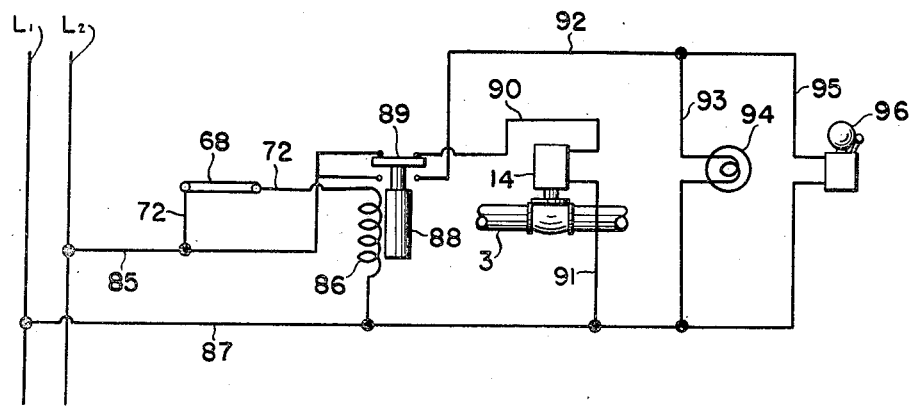
Fig. 12 is a wiring diagram showing the manner in which the operation of the safety shutter will serve to shut down furnace operation.

In Figure 12 there is shown a wiring diagram by means of which operation of the safety shutter 58 can be used to cut down the furnace operation, turn on a signal light and sound an alarm. As shown in that figure there is a supply line L1 and L2 of any suitable voltage. A circuit including the link 68 and its lead wires 72 extends from line L2 through conductor 85, one of the wires 72, fuse link 68, the other wire 72 and a solenoid coil 86, and a conductor 87 to the line L1. With this arrangement it will be seen that normally when the fuse link is in position the solenoid coil 86 is energized to keep its core 88 in an upper position with bridge member 89 closing the upper contacts of a solenoid operated switch. In this condition a circuit is made from one side of the line through conductor 85, bridge 89, conductor 90, the coil in solenoid operated valve 14, conductor 91 and conductor 87 back to line L1. Thus, normally a solenoid valve 14 in the fuel line 3 is energized and this valve is open. When, however, for some reason the fuse link 68 is melted and the shutter 58 is closed the circuit through the coil 86 will be broken and the core 88 will drop down permitting the bridge member 89 to open its upper contacts and break the circuit to the solenoid valve 14. This valve will, therefore, close and shut off the suply of fuel to the furnace. At the same time that the bridging member opens the upper switch contacts it will bridge a pair of lower contacts to complete a circuit from line L2 through the conductor 85, conductors 92 and 93 and through a lamp 94 back to conductor 87 and line L1. In parallel with the lamp 94 is another wire 95 leading to an alarm 96 which will be sounded at the same time that the light 94 is turned on. Thus it will be seen that at the same time that the fuel valve is closed an indicator light will be turned on and an alarm will be sounded so that the attendant will know that the furnace has been shut down and can take the necessary steps to set the furnace in operation again.

In some cases it may be desirable to use a closed end sighting tube instead of an open end sighting tube of the type described above. In such a case a closed end tube 97 either ceramic or metal, depending upon the use to which it may be put, may be inserted in the furnace. This tube is provided on its right end with screw threads that are adapted to receive a fitting 98, which is provided with a counterbore 99 similar to the counterbores that were previously described in the various accessories. The pyrometer can be fitted directly into this counterbore which is adapted to receive the projection 75 thereof or the various units may be used between the collar 98 and the pyrometer if it is so desired. Generally speaking the type of connection shown between the tube 97 and the flange 98 will be rigid so that no ball and socket joint is necessary in order to properly align the pyrometer with the target end of the tube. If this is not the case, however, a socket member similar to member 35 may be used in conjunction with the flange 98 in order to support the other pyrometer accessories.

In Fig. 8 there is shown another accessory which may be used if desired between, for example, the unit 35 in Fig. 2 and the air cooled unit 47. This fitting 100 is provided with a counterbore 101 that is adapted to receive a projection such as shown at 48 on the air cooled unit and is also provided with a convex surface 102 that acts as the ball part of the ball and socket joint and is adapted to cooperate with surface 37 of the socket member 35.

Depending upon the type of treatment that is being given to its charge, furnaces often have to be operated at pressures above atmospheric or with controlled atmospheres. For this reason it is necessary that the joints between each of the various accessory units be pressure tight. The projections and counterbores on the units are therefore carefully machined so that the fit between them will be accurate. The surfaces of the parts forming the ball and socket joint are also accurately machined. In addition to this any suitable type of stuffing may be used in the conduit 73 to prevent infiltration of air between the conduit and the wires 72. In some cases if the furnace is being operated at unusually high pressures suitable gaskets may be necessary in the joints between the fittings in order to make these joints pressure tight.

From the above detailed description it will be seen that I have provided a complete set of accessories to be used with a radiation pyrometer. These accessories include sighting tubes which can be set up in various lengths depending upon the size of the furnace with which the pyrometer is used. A water cooled unit, an air cooled unit and a shutter unit are also provided with proper connections and fittings between these various units so that they can be used together or in combination as may be desired or necessary for any particular installation. The units are so designed that they provide a central passage through which radiation from the furnace may be directed from the pyrometer. With the use of these accessories the pyrometer will not be likely to give incorrect readings due to the influx of soot, smoke or any other foreign matter in its field. These accessories when used in the proper combination will insure that the pyrometer and the furnace will at all times be protected and that the pyrometer give correct readings.

While in accordance with the provisions of the statutes, I have illustrated and described the best form of this invention now known to me, it would be apparent to those skilled in the art that changes may be made in the form of the apparatus disclosed without departing from the spirit of this invention as set forth in the appended claims, and that in some cases certain features of this invention may sometimes be used to advantage without a corresponding use of other features.

Having now described this invention, what I claim as new and desire to secure by Letters Patent is:

1. In combination, a radiation pyrometer, a sighting tube comprising a plurality of individual tube sections joined together, each section being formed with a pair of outturned flanges on one end and each section except one end section being formed with inturned flanges on its opposite end, said inturned and outturned flanges on each section being adapted to cooperate with each other to join said tube sections together, and means to attach said pyrometer to said opposite end of said one end section.

2. In combination, a radiation pyrometer, a sighting tube comprising a plurality of individual tube sections joined together at their ends, said sections increasing progressively in size from end to end of the tube, each tube section having outturned flanges on one end, and each tube section except the smallest having inturned flanges on its other end, the arrangement being such that the inturned flanges on one tube section are supported by the outturned flanges on the next smaller tube section, the smallest tube being formed with a collar on its end opposite the end having the flanges from which the sighting tube may be supported, and means to attach said pyrometer to said collar.

3. In combination, a radiation pyrometer, a sighting tube comprising a plurality of individual tube sections, each section being progressively larger than the next adjacent section to form a tube generally conical in shape, means formed on each tube to hold the sections together, a shield member fastened to the end of the largest tube section said shield section having the form of a truncated cone, and means to attach said pyrometer to the smallest tube section.

4. In combination, a radiation pyrometer, a sighting tube comprising a plurality of tube sections of progressively larger diameters from end to end of the tube, said tube sections being fastened together by bayonet joint means, the largest tube section being formed with outturned flanges on its end, a radiation shield member of truncated cone shape formed with inturned flanges on its small end adapted to cooperate with said outturned flanges and be supported thereby, the tube being generally conical in form with a flaring end, and means to attach said pyrometer to the smallest tube section.

5. In combination for use with a heated enclosure having an opening in the top thereof, a sighting tube for extending into the enclosure through said opening with one end extending above said opening, a collar formed on said end of the tube, a support to adjustably hold said tube in place comprising a pair of plates each having an opening therein through which said tube end extends, said collar resting upon the uppermost of said plates, and means to adjustably hold said plates one above the other whereby the position of said end of said tube can be adjusted relative to the top of the enclosure.

6. In combination for use with a heated enclosure having an opening in the top thereof, a sighting tube for extending into the enclosure through said opening with one end extending above said opening, a collar formed on said end of the tube, a support to hold said tube in the enclosure comprising a pair of plates located one above the other, each plate having an opening through which said tube extends, the collar on the tube resting on the upper plate, and means to adjustably hold said plates in position comprising a plurality of threaded posts projecting upwardly from said lower plate, said upper plate having additional openings through which said posts extend, nuts threaded on said posts to support said plate, and additional nuts threaded on said posts to hold said upper plate in position.

7. An assembly for use in pyrometry comprising a sighting tube made up of individual tube sections, the sections being progressively larger from end to end of the tube, means to fasten said tube sections together comprising outturned flanges on the end of one tube section cooperating with inturned flanges on the end of the next larger tube section, a collar on one end of said sighting tube, a shutter unit, means cooperating with said collar to fasten said tube and shutter unit together, a manually operated shutter member in said shutter unit, an automatically operated shutter member in said shutter unit, means normally biasing said last mentioned shutter into a closed position and means holding it in an open position, said last mentioned means including a fusible link located in a position to be subjected to the temperature of said tubes, an electric circuit of which said fusible link forms a part, a valve normally maintained in open position, operating mechanism for said valve also in said electric circuit, said circuit opening upon failure of said fusible link whereby said valve is permitted to close.

8. A shutter unit to be used in pyrometry comprising a casing having a central opening therethrough, a manually operated closure member pivoted therein, means to move said member from a position in which it does not to a position in which it does obstruct said opening, an automatically operated closure member also pivoted in said casing, means normally biasing said last mentioned member into a position to obstruct said opening, and stop means to hold said last mentioned member in a position in which said opening is not obstructed, said stop means having the characteristic of rupturing at a predetermined temperature.

9. A shutter unit to be used in pyrometry comprising a casing having a centrally located opening therein, a first and a second shutter, means to pivot said shutters in said casing, means to maintain said first shutter in a position in which said opening is not obstructed, manually operated means to move said first shutter into opening obstructing position, means to normally bias said second shutter into opening obstructing position, and means having the characteristic of rupturing when subjected to a predetermined maximum temperature to hold said second shutter in a position in which said opening is not obstructed.

10. A shutter unit to be used in pyrometry comprising a casing having an opening therein, a first shutter member, means to pivot said shutter member in said casing, manually operated means to move said shutter member from a position in which it obstructs said opening to a position in which it does not obstruct said opening, means tending to hold said shutter in an adjusted position, a second shutter member, means to pivot said second shutter member in said casing, means normally biasing said second shutter member to a position to obstruct said opening and means to hold said second shutter member in a position in which said opening is not obstructed comprising an insulating projection on said second shutter member, an insulating member attached in said casing, supports fastened to said insulating member, and a fusible link detachably mounted on said supports, said insulating projection bearing on said fusible link in the normal open position of the second shutter member.

11. A safety shutter unit for use in pyrometry comprising a casing having a central opening therein, a shutter pivoted in said casing and movable from a position in which said opening is not obstructed to a position in which it will be obstructed, means to bias said shutter into a position in which it will obstruct said opening and means to normally keep said shutter in its non-obstructing position comprising an insulating projection on said shutter, a pair of supports, means to insulate said supports from said casing, and a fuse link detachably mounted on said supports, said insulating projection bearing on said fuse link.

12. A safety shutter unit for use in pyrometry comprising a casing having an opening in it, a shutter pivoted in said casing for movement from a position in which it obstructs said opening to a position clear of said opening, spring means to bias said shutter to its obstructing position, a stop to limit the movement of said shutter, an insulating member mounted in said casing, a pair of supports mounted on said insulating member, a fusible link detachably mounted on said supports and lying adjacent the edge of said opening and beside said shutter, and an insulated projection on said shutter and extending over said fusible link whereby engagement between said link and projection will hold said shutter in its position clear of said opening.

13. A temperature measuring and controlling system comprising in combination, a heater, a fuel supply line therefore, an electrically operated valve in said fuel supply line normally in a closed position, but being open when energized, a pyrometer to measure the temperature of said heater, an accessory assembly to hold said pyrometer in position on said heater and including a safety shutter unit, a shutter biased into a position to prevent operation of said pyrometer, a fusible link adapted to be fused upon the occurrence of a dangerously high temperature at said shutter unit and operative to keep said shutter out of its biased position, an electric circuit including said fusible link, a source of current and a relay, contacts closed by said relay to close a circuit including said fuel valve whereby the latter will be energized, the operation being such that as long as the fusible link is intact said relay will be energized to cause energization of said valve, a signaling device, means to operate said signaling device upon deenergization of said relay produced by failure of said fusible link.

14. A temperature measuring and controlling system comprising in combination a heater, a fuel line to supply fuel thereto a normally closed valve in said fuel line, electric valve operating means to maintain said valve in open position, means to measure the temperature of said heater, a shutter unit to protect said measuring means comprising a shutter biased in a position to stop the measurement of the temperature of said heater by said measuring means, a fusible link to maintain said shutter out of said position, and a normally closed electric circuit controlling said electric valve operating means and including said fusible link whereby said valve will be kept open and said measuring means can measure the temperature of the heater as long as said fusible link is intact.

JOSEPH P. VOLLRATH.